May 30, 1933.  M. D. FITZGERALD  1,911,226
CYLINDER HEAD GASKET
Filed Aug. 1, 1929
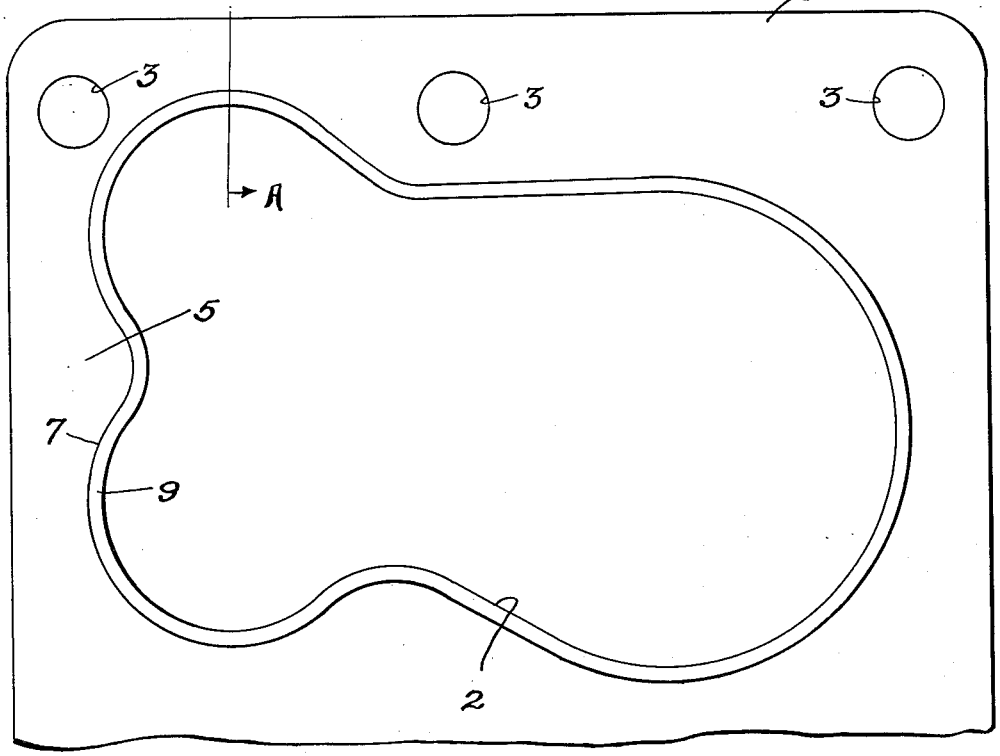
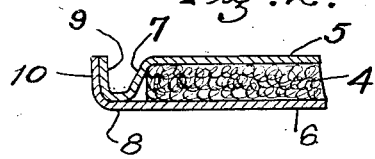
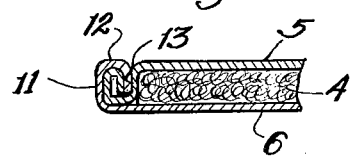
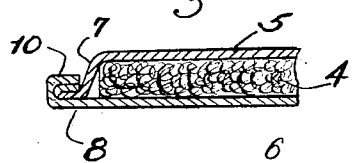
Inventor
MARTIN D. FITZGERALD.
By Sturtevant & Mason
Attorneys Patented May 30, 1933

1,911,226

UNITED STATES PATENT OFFICE

MARTIN D. FITZGERALD, OF TORRINGTON, CONNECTICUT, ASSIGNOR TO THE FITZGERALD MANUFACTURING COMPANY, OF TORRINGTON, CONNECTICUT, A CORPORATION OF CONNECTICUT

CYLINDER HEAD GASKET

Application filed August 1, 1929. Serial No. 382,611.

The invention relates to new and useful improvements in gaskets for internal combustion engines, and more particularly to a gasket adapted to be placed between the cylinder head and the cylinder block.

An object of the invention is to provide a gasket of the above type composed of a sheet of packing and pliable metal plates which are so united as to form a structure of substantially uniform thickness, and at the same time completely enclose and house the edge of the packing at the cylinder opening.

In the drawing which shows by way of illustration one embodiment of the invention:

Figure 1 is a plan view of a portion of a gasket embodying the invention.

Fig. 2 is a sectional view on the line A—A of Fig. 1 showing the initial assembling of the edge portions before they are interlocked by the folding of the metal.

Fig. 3 is a view similar to Fig. 2 showing the edge portions folded into interlocked relation.

Fig. 4 is a view similar to Fig. 3 showing a slightly modified form of the invention.

The invention is directed to a gasket for internal combustion engines, and more particularly to a gasket for making a tight joint between the cylinder head and the cylinder block. The gasket of course may be used with a single cylinder machine, or a multiple cylinder machine. It is provided with an opening for each cylinder when a multiple cylinder is used. The gasket consists of a sheet of packing and a pliable metal plate on each face of the sheet of packing. The sheet of packing is preferably made of asbestos, and the pliable metal plates are preferably of copper. The packing is provided with an opening for the cylinder. The metal plates are likewise provided with an opening shaped to conform to the cylinder chamber. The metal plates project beyond the edge of the packing, and one of the metal plates is folded across the edge of the packing into contact with the other metal plate. The projecting portions of the metal plates are thus brought into close juxtaposition. The edge portions are subsequently folded back to form an interlocked connection. They may be again folded to increase the effective interlocking of the plates and the housing of the packing.

Referring more in detail to the drawing the gasket is shown in Figure 1 as indicated at 1. This gasket is provided with an opening 2 conforming to the chamber in the cylinder. The gasket as shown is only a portion of a gasket for a multiple cylinder engine. There are also openings 3, 3 for the securing bolts which join the head of the cylinder to the cylinder block. The gasket includes a packing 4 made of asbestos or some similar material. It also includes metal plates 5 and 6 made of copper, or some similar pliable material. The packing is provided with an opening, which is slightly larger than the diameter of the cylinder. The metal plates 5 and 6 project beyond the edge of the packing. The plate 5 is folded sharply downwardly at 7 so as to contact with the projecting portion 8 of the plate 6. The edge portions 9 and 10 of the plates 5 and 6 respectively lie in contact with each other. The plate 6 may be provided with an upturned edge portion, and the plate 5 provided with a downwardly turned portion, and an upturned portion so that initially when the plate 5 is placed on the packing 4 the parts will be positioned as shown in Fig. 2 of the drawing. The plates 5 and 6 are then firmly pressed against the packing, and the edge portions 9 and 10 folded down against the outer face of the edge portion of the plate 5, as indicated in Fig. 3 of the drawing. This folding down of the edge portions firmly interlocks the edge portions and completely houses the packing. The gasket is of uniform thickness, and will be firmly clamped by the cylinder head pressing the same against the cylinder block. There is no chance for the gases under pressure escaping along the outer surface of the plates 5 and 6 due to this tight clamping of the head against the gasket. There is no chance of the gases under pressure working through the interlocked portions and escaping through the packing 4 resulting in a blow-out.

In Figure 4 of the drawing the gasket is shown as consisting of a packing 4 and pliable metal plates 5 and 6 similar to those above described. The portions of the metal plates which project beyond the end of the pad are of greater length, and instead of being folded back flat on themselves they are bent upwardly at 11, thence outwardly at 12, and thence downwardly at 13. This forms an extended interlocking engagement between the parts. It also forms a metal binding around the opening forming the cylinder chamber which is of substantially the same thickness as the gasket. The pressure of the block on the folded metal parts will cause the said folded metal parts to be more tightly engaged and thus increases the effectiveness of the housing of the end of the packing 4.

It will be noted that various other ways of interlocking the edge portions of the plates may be permitted. The essential feature of the invention consists in the folding of the edge portions of the cover beyond the edge of the packing so as to completely house the packing and position said interfolded parts within the limits of the thickness of the packing so as not to interfere with the clamping of the gasket.

Having thus fully described my invention, what I claim as new and desire to secure by Letters Patent, is:—

A gasket for internal combustion engines or the like including a sheet of packing material having a cylinder opening within its limits, a plate of pliable metal on each face of the packing material covering the same, said plates having edge portions projecting beyond the end of the packing material at the cylinder opening, one of said metal edge portions being folded across the end edge of the packing material at the cylinder opening into contact with the other edge portion, said contacting edge portions being together folded back upon themselves, said folded portions being upturned and again folded back upon themselves to produce an extended tight interlock of the edge portions for housing the edge of the packing material, said folded portions being of substantially the same thickness as the gasket so that the gasket is of uniform thickness throughout.

In testimony whereof, I affix my signature.

MARTIN D. FITZGERALD.